United States Patent
Cole et al.

(10) Patent No.: US 7,391,147 B2
(45) Date of Patent: Jun. 24, 2008

(54) PLANAR ULTRA VIOLET LIGHT DETECTOR

(75) Inventors: Barrett E. Cole, Bloomington, MN (US); Robert E. Higashi, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 560 days.

(21) Appl. No.: 10/735,531

(22) Filed: Dec. 12, 2003

(65) Prior Publication Data

US 2005/0127835 A1 Jun. 16, 2005

(51) Int. Cl.
*H05H 7/06* (2006.01)
(52) U.S. Cl. .................... 313/359.1; 313/538
(58) Field of Classification Search .......... 313/538–540
See application file for complete search history.

(56) References Cited

U.S. PATENT DOCUMENTS

| | | | |
|---|---|---|---|
| 3,732,452 A * | 5/1973 | Axmark et al. | 313/538 |
| 4,931,688 A | 6/1990 | Tosswill | |
| 5,489,817 A * | 2/1996 | Muller et al. | 313/495 |
| 5,500,531 A | 3/1996 | Bu | |
| 6,541,836 B2 * | 4/2003 | Iwanczyk et al. | 257/429 |
| 2002/0079456 A1 | 6/2002 | Lingren et al. | |
| 2004/0100194 A1 * | 5/2004 | Eden et al. | 313/538 |

FOREIGN PATENT DOCUMENTS

| DE | 4229315 | 3/1994 |
|---|---|---|
| DE | 4407730 | 9/1995 |

OTHER PUBLICATIONS

Cheng et al., Localized Silicon Fusion and Eutectic Bonding for MEMS Fabrication and Packaging, Journal of Microelectromechanical systems, vol. 9, No. 1, Mar. 2000, pp. 3-7.*
Meyers et al., "Geiger photodiode array for compact, lightweight laser-induced breakdown spectroscopy instrumentation," Applied Optics, vol. 42 No. 30, pp. 6072-6077, Oct. 20, 2003.
Yang, et al., "Micromachined Geiger Tubes for Low Cost Flame Detection," 5 pages, prior to the filing date of Dec. 12, 2003.

* cited by examiner

*Primary Examiner*—Joseph L Williams
(74) *Attorney, Agent, or Firm*—Kris T. Fredrick

(57) ABSTRACT

A light detector having a cathode wafer, a cavity wafer and an anode wafer. The cathode wafer may be bonded to one side of the cavity wafer and the anode wafer may be bonded to another side of the cavity wafer. The cathode wafer may have numerous cathodes, the anode wafer numerous anodes and the cavity wafer numerous cavities which may be aligned on a one-to-one basis to form a wafer structure of a plurality of detectors which may be diced into separable detector chips. When there is a voltage potential across a cathode and an anode, and a gas such as Ne or the like in the cavity, a reception of light such as ultra violet may result in an electronic discharge between the cathode and anode of the light detector.

24 Claims, 9 Drawing Sheets

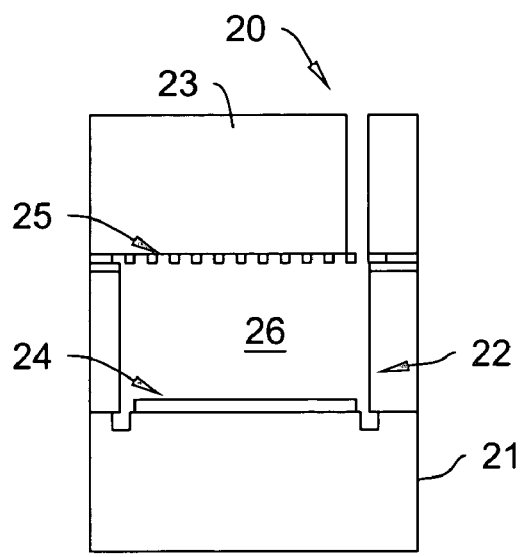
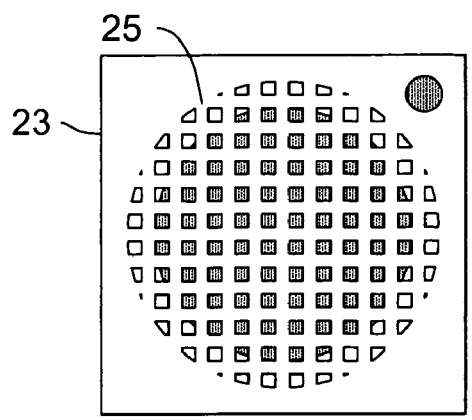
*Figure 2*    *Figure 3*
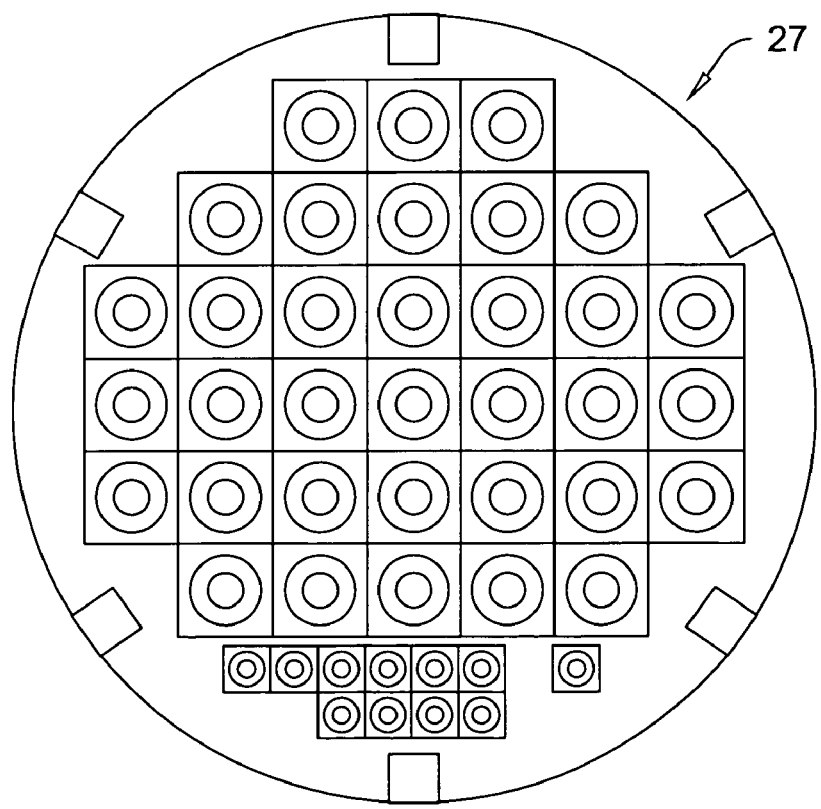
*Figure 4*

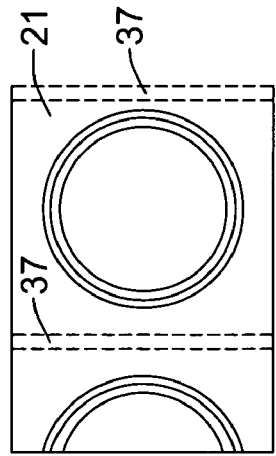
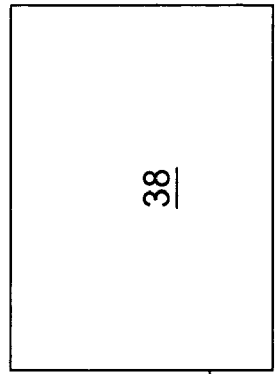
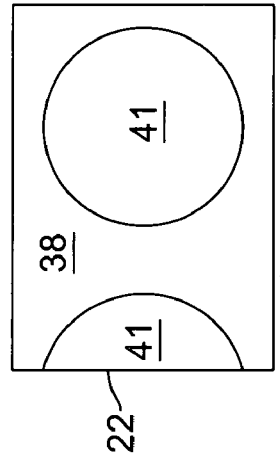
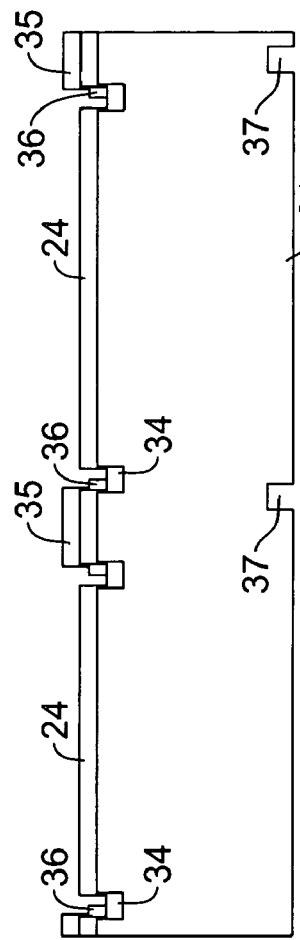
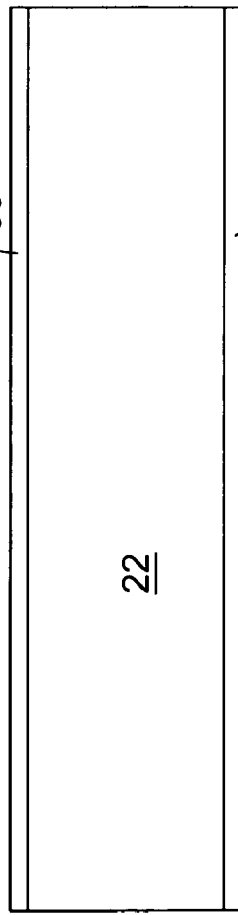
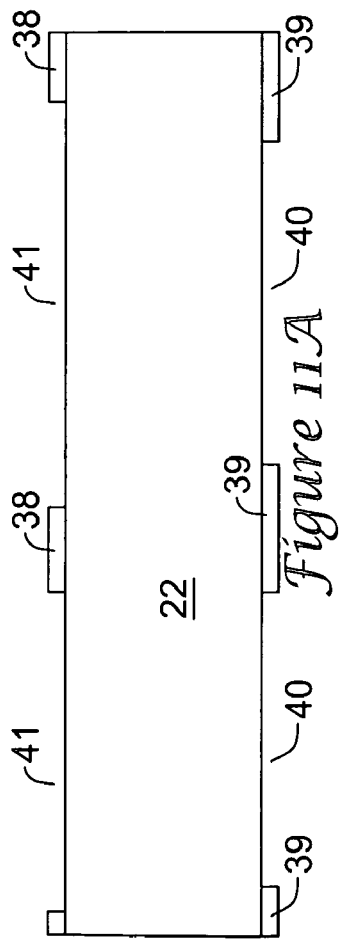

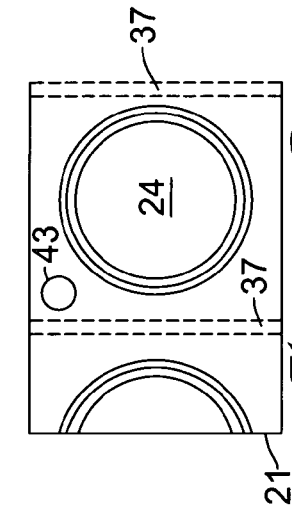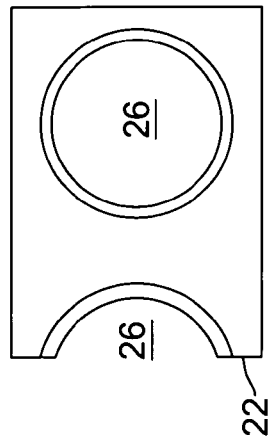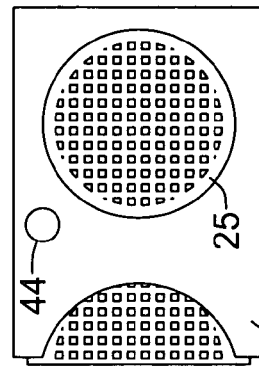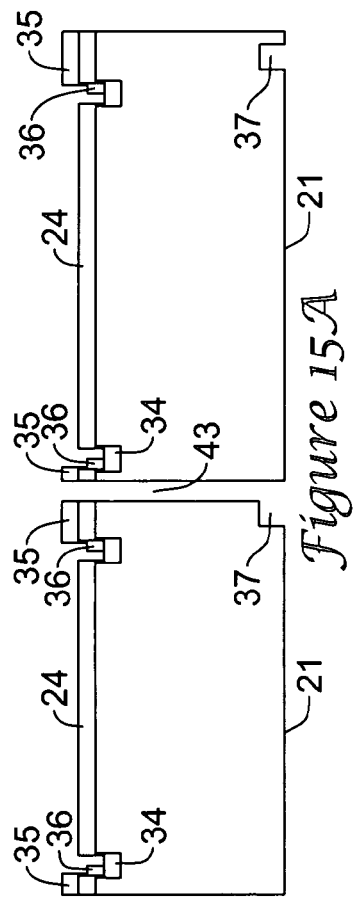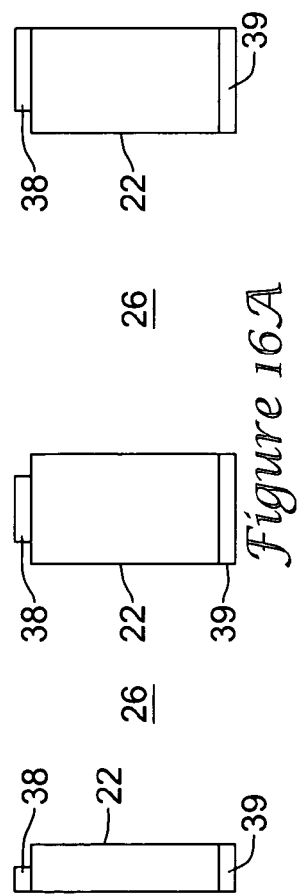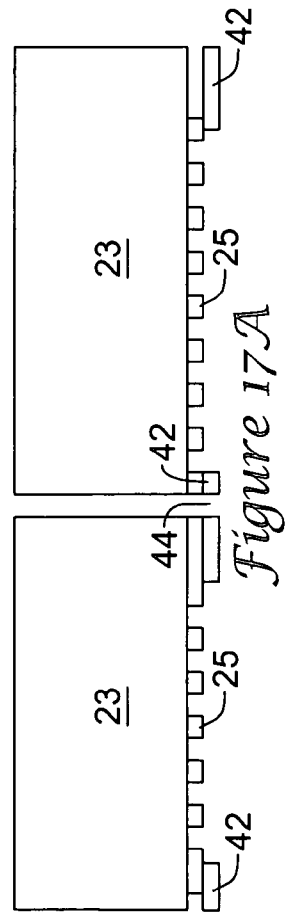

PLANAR ULTRA VIOLET LIGHT DETECTOR

BACKGROUND

The present invention relates to sensors and particularly to ultra violet light (UV) detectors. More particularly, the invention relates to detecting UV from various sources of light.

Successful related art UV detectors have been primarily based on highly specialized processes built around "vacuum" tube technology. The physics of such detectors are that the tube of each detector may have a cathode electrode such as tungsten or copper which is the surface from which optically excited electrons are originated, and an anode grid that lets light pass through it but is charged such that it will collect electrons generated by the breakdown instigated by the photoemission of an electron at the cathode surface. The tube may be filled with a neon/hydrogen (Ne/$H_2$) gas mixture to facilitate the breakdown nominally at about 100 Torr residual pressure. Several factors that appear to define and limit device yield and performance may include tube glass cleanliness, gas mixture, plate spacing and gas contamination. These potential causes of problems may be eliminated or minimized with the present invention.

SUMMARY

The present invention is a wafer-based UV detection device. It is effectively a micro-machined Geiger-Mueller tube type structure based on micro-fabrication processes, such as the new MEMS and silicon integrated current fabrication technology with wafer-scale batch processes. The silicon device may be a "mini tube" having equal or better performance, significantly smaller size and lower cost than the related art UV sensing tubes. The present device may involve an assembly of three wafers. They include a lower silica cathode wafer, an intermediate fused silica spacer/plasma wafer having a volume of space, and a top silica mode wafer. A "tube" chamber may exist between the top and bottom wafers. The chamber may be situated between the anode and cathode. The device may be an all-fused silica wafer stack. There may be various configuration permutations in the mask layout used for fabricating the wafer-based detection device, which may affect performance, yield and lifetime of the device.

BRIEF DESCRIPTION OF THE DRAWINGS

FIG. 2 is a cross-section view of a wafer-based UV light detection device;

FIG. 3 shows a plan view of the detection device revealing the anode grid;

FIG. 4 shows a wafer with numerous devices prior to dicing;

FIGS. 9a and 9b reveal the patterned street features on the back of the cathode wafer;

FIGS. 10a and 10b show the spacer wafer with a layer of metal on the front and back of it;

FIGS. 11a and 11b show the spacer wafer with alignment marks for drilling;

FIGS. 15a and 15b reveal a contact hole for an external connection to the cathode;

FIGS. 16a and 15b show the drilled chamber hole of the spacer wafer;

FIGS. 17a and 17b reveal a contact hole for an external connection to the anode;

DESCRIPTION

Figure 1:
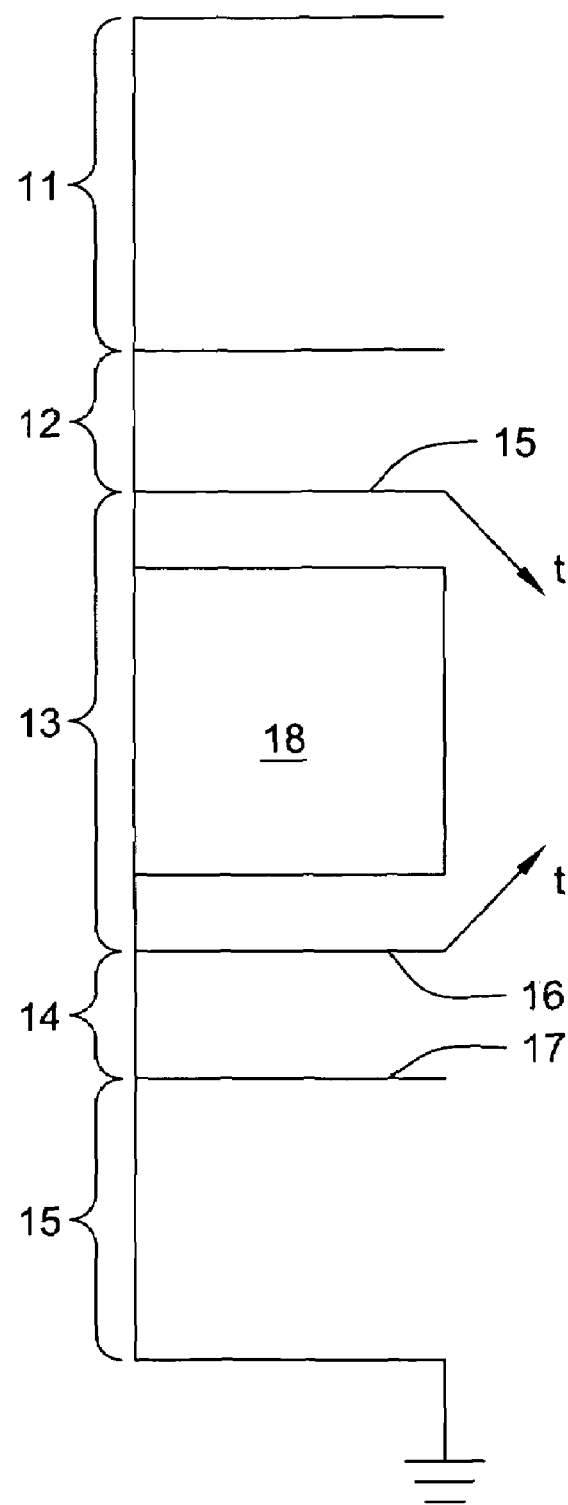
FIG. 1 shows relative voltage levels for UV tube operation.

FIG. 1 reveals relative voltage ranges for a UV tube operation. Voltage range 11 shows a plasma discharge in the tube without the presence of UV light. Range 12 is where the breakdown voltage starts and voltage 15 is where the discharge stops without UV. Voltage 16 is the voltage starting level with UV. In voltage range 14, between voltages 17 and 16, the discharge may be sustained in the presence of UV light but will not start in the absence of UV. A voltage in range 15 below the discharge sustaining voltage 17, there is no discharge even in the presence of UV light. Region 18 may be in a desired operating voltage range for UV tube operation.

FIG. 2 is a cross-section view of the wafer-based UV light detection mini tube or device 20. The three wafers that may be the structural basis of sensor or detector 20 include a silica cathode wafer 21, a silica spacer wafer 22 and a silica anode wafer 23. Other appropriate materials, particularly those with similar temperature coefficients of expansion, may be used in lieu of silica for one or more of wafers 21, 22 and 23. Formed on wafer 21 may be a cathode metal 24 and on wafer 23 may be an anode metal 25. Space wafer 22 is a support between wafers 21 and 23 to provide a discharge or plasma "tube-like" space, cavity or chamber 26 for detector 20. FIG. 3 reveals a grid-like appearance of anode 25. Numerous detectors 20 may be fabricated together on wafer combination 27 of several inches in diameter as shown in FIG. 4. Wafer combination 27 may be diced into individual detector 20 chips or groups of detector 20 chips.

Figure 5A:
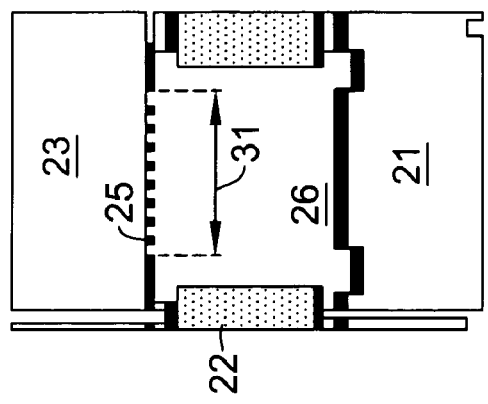
FIGS. 5a, 5b, 5c, 5d and 5e identify a chamber diameter, the cathode diameter, the anode opening size, the anode mesh size and the seal gap between cathode and spacer wafers of the UV detection device, respectively.
Figure 5B:
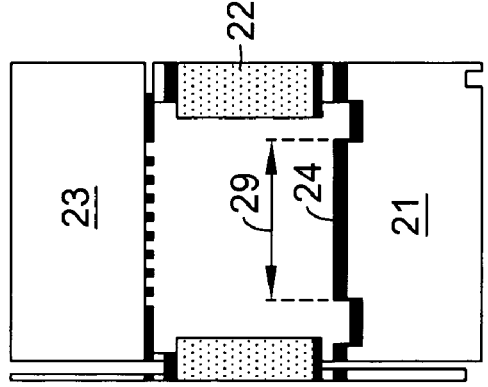
Figure 5C:
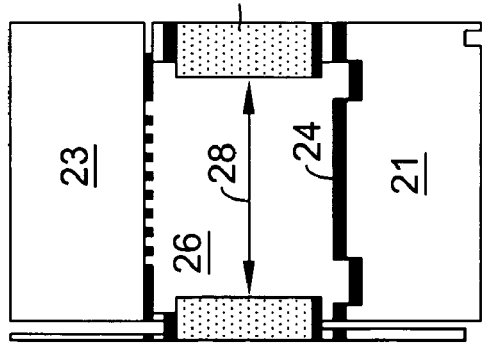
Figure 5D:
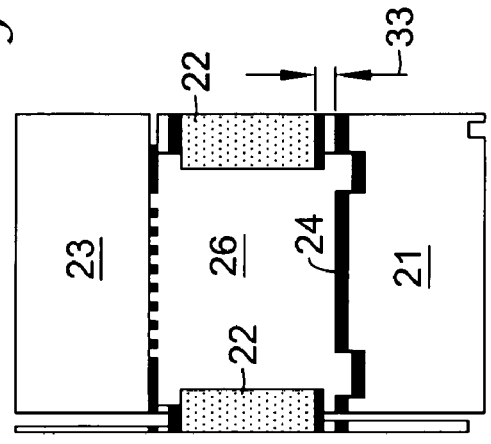
Figure 5E:
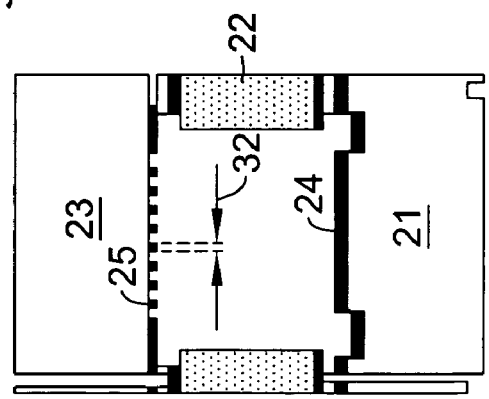

Various dimensions of detector 20 may include cathode 24 size, anode 25 size, anode mesh size, the gap between the anode feature on the top anode wafer 23 and the chamber 26 hole in the fused silica wafer 22. FIG. 5a shows that the diameter 28 of chamber 26 may be 5 or 9 millimeters (mm). Diameter 28 may be chosen to be consistent with the standard tube cathode 24 area. The photo cathode 24 metal platform of FIG. 5b may have a diameter 29 of 4, 5.6 or 8 mm. One may chose the smaller cathode and anode to increase die leverage for better cost per chip. FIG. 5c notes that the ratio of anode 25 opening 31 area to the cathode 24 opening 29 area may vary from 1:1 to 0.5:1. This parameter may aid in an understanding of the interaction between a spacer silica 22 hole size 28 and an anode 25 size 31 and cathode 24 size 29. In FIG. 5d, anode 25 may have a mesh size width 32 of 10 microns or 50 microns. This parameter may influence the anode 25 life as well as its transmission behavior. FIG. 5e notes cathode silica to spacer silica seal gap 33. Gap 33 may have a width of 100, 200 or 400 microns. This parameter may be used to control potential electrical leakage due to sputter deposition.

Figure 6B:
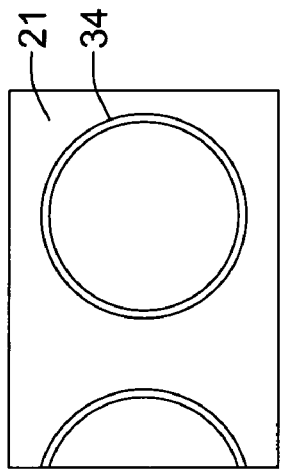
FIGS. 6a and 6b are a cross-section view and top view, respectively, of the etched moat in the cathode wafer.
Figure 6A:
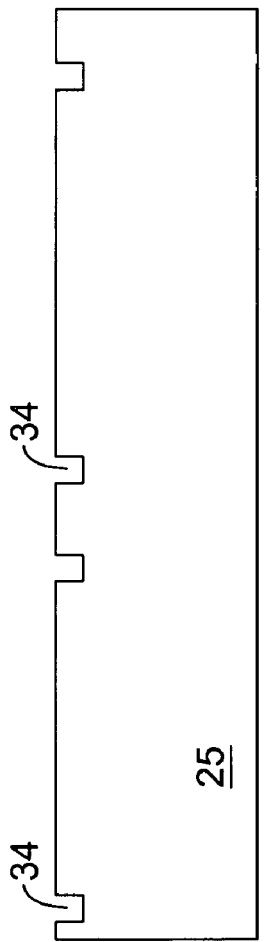

A process sequence may be used in making detector 20. Even though the ensuing steps in this description are related to only one detector device 20, the effects of the steps may be multiplied by the number of devices 20 on the wafers because the steps may be applied to whole wafer of potential devices 20. The order of the steps may be varied. Other steps may be added. Some steps may be skipped or deleted. Also, what constitutes a step may be changed. The materials mentioned in the present description are merely illustrative examples as other materials may be appropriate for the structure of the present invention. In the first step, a moat 34 may be patterned in cathode wafer 21 using LAM or a glass etcher. Moat 34 depth may be a parameter for splits. A first mask may be used for the pattern in etching wafer 21. This step is shown in the cross-section view of FIG. 6a and the top view of FIG. 6b.

Figure 7B:
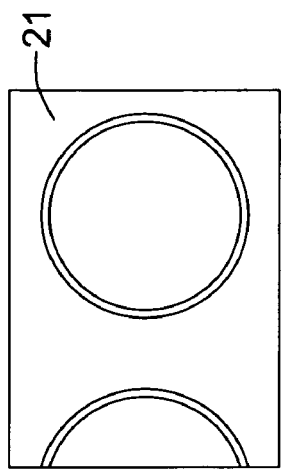
FIGS. 7a and 7b show a deposit of cathode metal and a eutectic layer.
Figure 7A:
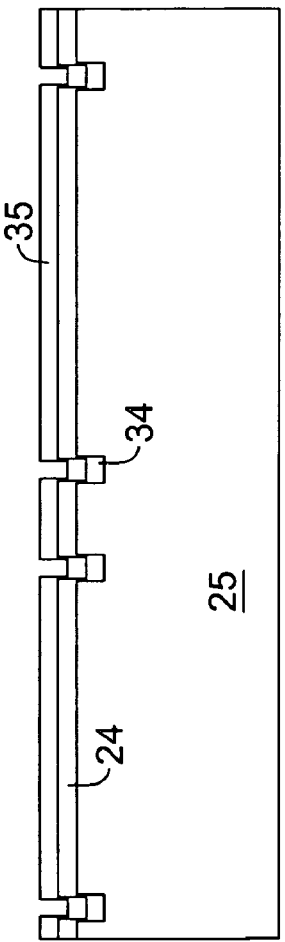

The second step may include depositing tungsten (W) cathode 24 material over the whole of wafer 25 at a maximum thickness, followed by 5000 angstons of sputtered silicon as a eutectic layer 35. Other materials may be used for cathode 24. The cross-section and top views of this step are shown in FIGS. 7a and 7b, respectively.

Figure 8B:
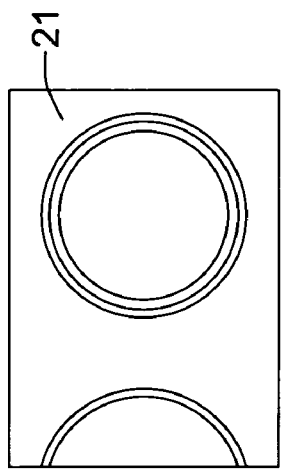
FIGS. 8a and 8b show the removal of the eutectic layer to expose the cathode metal.
Figure 8A:
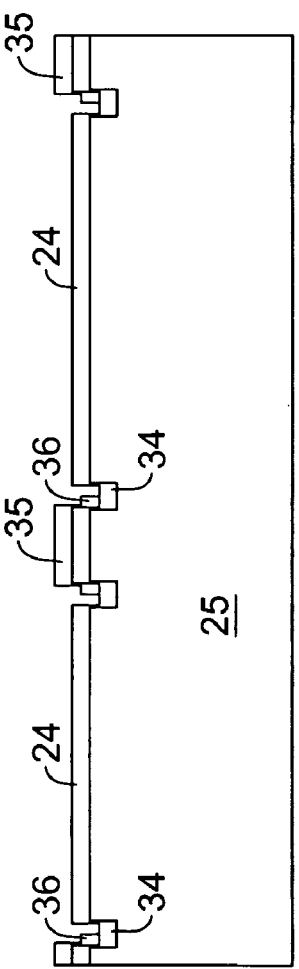

In step three, a second mask may be used to pattern eutectic layer 35 on cathode wafer 21 to expose W cathode 24 surfaces as well as open alignment 36 for wafer drilling alignment. Alignment marks 36 may be aligned to moat cut 34. This step is shown in FIGS. 8a and 8b.

For step four, 200 angstroms of titanium-tungsten (TiW) may be deposited on the back of wafer 25 (not shown). Using a third mask, one may pattern street features 37 and wafer bonder marks on the back side of cathode wafer 25 for visual references. One may align front to back using standard masks. One thousand angstroms of sputtered silicon nitride ($Si_3N_4$) may be deposited on the back to passivate the TiW in the bonder marks (not shown). Streets 37 are shown in FIGS. 9a and 9b.

In step five, 1000 angstroms of TiW and 6 microns of gold (Au) may be deposited on the top side of gap wafer 22. In step six, 1000 angstroms of TiW and 6 microns of Au may be deposited on the bottom side of gap wafer 22. The six microns of gold in the eutectic bonding layer on the top and bottom surfaces of gap or spacer wafer 22 may accommodate flatness discrepancies between wafer 22 and wafers 23 and 21, respectfully. These depositions are represented by layers 38 and 39 in FIGS. 10a and 10b. Further, a thin layer of gold or like material may be deposited on the surface of each wafer (21, 22 and 23) where other bonding material is to be applied for the purpose of a bonding to another wafer. In step seven, the top side of gap wafer 22 may be patterned with a flag clearing mask (i.e., the fourth mask). Likewise, the bottom side of wafer 22 may be patterned. Then layers 38 and 39 of Au and TiW may be wet etched in areas 41 and 40, respectively, as shown by FIG. 11a. FIG. 11b shows the top side of etched layer 38.

Figure 12A:
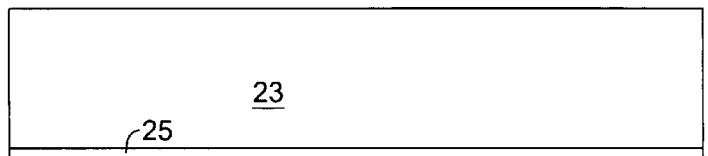
FIGS. 12a and 12b reveal anode metal and eutectic layers on the anode wafer.
Figure 12B:
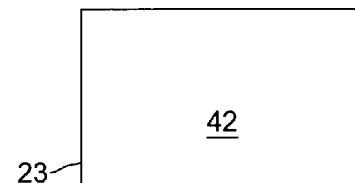

For step eight, 5000 angstroms on Ni may be deposited on the bottom side of anode wafer 23, followed by a deposit of 5000 angstroms of silicon (Si) or the like, as indicated by layers 25 and 42, respectively. A nickel (Ni) layer 25 may be the anode material. Other materials may be used in lieu of Ni. The Si deposition may be for a eutectic layer 42. FIGS. 12a and 12b show this step.

Figure 13A:
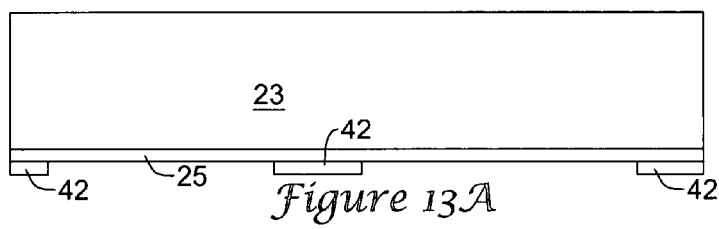
FIGS. 13a and 13b show the exposure of the anode metal with the unmasked portion of the eutectic layer removed.
Figure 13B:
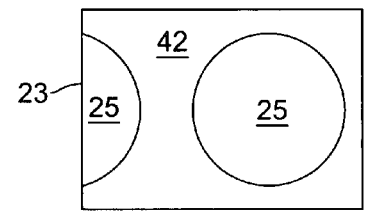

For step nine, a fifth mask may be used to pattern an anode seal feature. The mask pattern may be centered as well as possible. Etching may be used to remove the unmasked portion of eutectic layer 42. Anode layer 25 of Ni functions as an etch stop in this step. The step result is shown in a cross-section view in FIG. 13a and a top view in FIG. 13b.

Figure 14A:
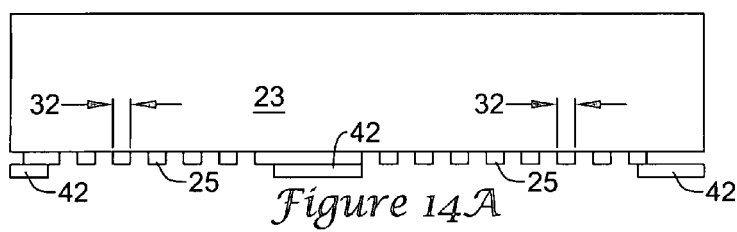
FIGS. 14a and 14b illustrate the pattern and etch of the anode grid on the anode wafer.
Figure 14B:
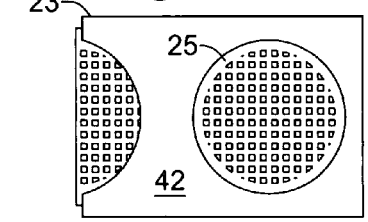

In step ten, an anode grid feature with dimension 32 may be patterned with a sixth mask on Ni layer 25 of wafer 23. The pattern of the sixth mask may be aligned with the eutectic layer cut of the fifth mask. The etching of the pattern into the nickel may result in anode grid 25. FIGS. 14a and 14b reveal the resultant anode grid 25.

In step 11, cathode wafer 21 may have a contact hole 43 drilled, as shown in FIGS. 12a and 12b (top view). The hole may be 1 mm in diameter for a contact from outside wafer 21 to cathode 24. The hole is shown in FIGS. 15a and 15b. An external contact connection to cathode 24 may be placed through hole 43.

In step 12, spacer wafer 22 may have a 5 mm or 9 mm chamber hole drilled and/or machined to obtain space 26 between cathode 24 and anode 25 after assembly of detector 20. The resulting hole, chamber or space 26 in spacer wafer 22 is shown in FIGS. 16a and 16b.

In step 13, a 1 mm hole 44 may be drilled in anode wafer 23 for providing contact to anode 25 from outside of wafer 23. Hole 44 is shown in FIGS. 16a and 16b (bottom view). An external contact connection to anode 25 may be placed in hole 44.

Figure 18B:
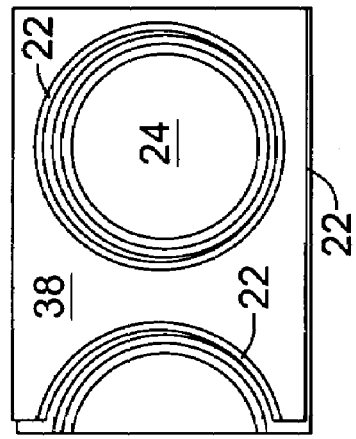
FIGS. 18a and 18b illustrate the eutectic bonding of the cathode wafer and the spacer wafer.
Figure 18A:
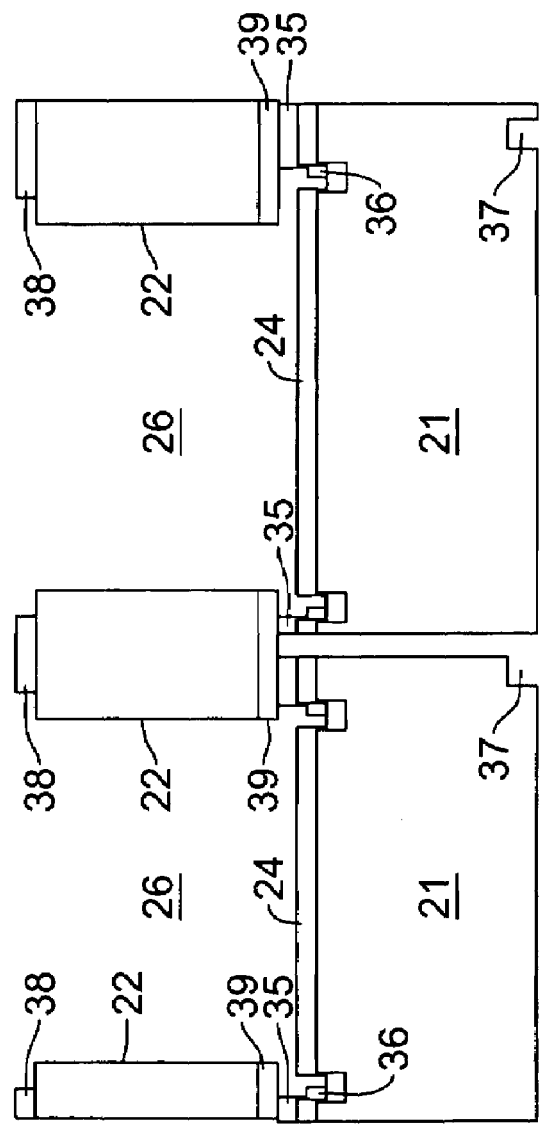
Figures 19A, 19B:
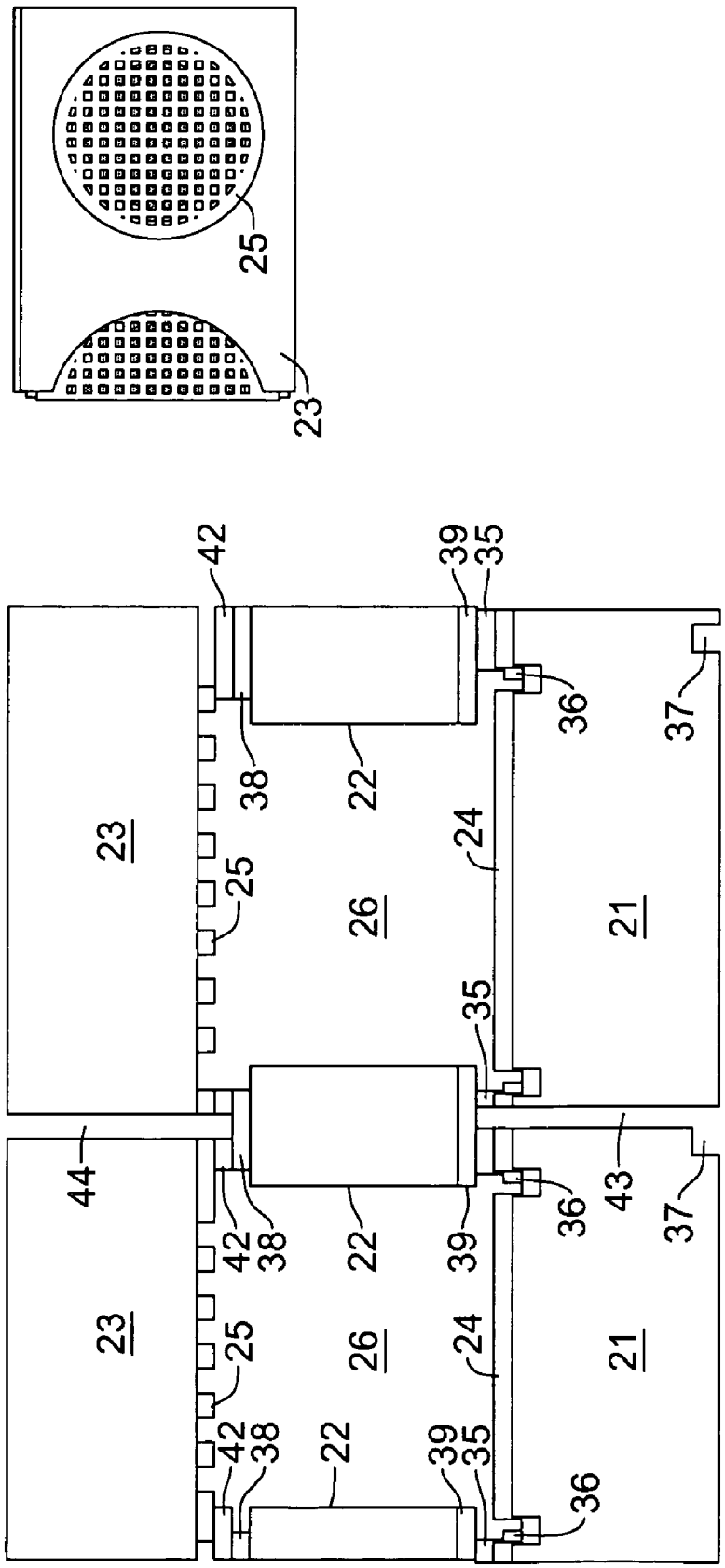
FIGS. 19a and 19b illustrate the eutectic bonding of the anode wafer to the spacer wafer resulting in a three wafer bonded assembly of numerous "mini-tube" detectors.

Step 14 may include bringing eutectic bond silicon surface 35 of cathode wafer 21 to bottom Au layer 39 of spacer wafer 22 in a bonder but ensuring that the Au surface of layer 39 does not touch the silicon carbide (SiC) chuck. First, wafer 21 may be put in the bonder with cathode 24 facing down. An image may be captured and then wafer 22 may be put in the bonder with the patterned gold face down (flag zones). The alignment masks between the cathode cut and flag clear the cut. Contact between patterned layers 39 and 35 may result in a eutectical bonding of wafers 22 and 21. These bonded wafers are shown in FIGS. 18a and 18b (top view).

Step 15 may involve aligning and baking out the cathode wafer 21/spacer wafer 22 bonded pair before the final eutectic bond with anode wafer 23, and backfilling with 15 percent hydrogen and 85 percent neon gas. To eutectically bond anode wafer 23 to the bonded pair of wafers 21 and 22, one may load anode wafer 23 first with the anode 25 features face down. Then one may align and capture an image, load the bonded wafer 21/22 pair with the wafer 21 face down and the TiW/Au surface of layer 39 face up. The marks on the back of wafer 21 may be aligned to the captured image. The flags are pulled to form the eutectic bond of wafers 22 and 23 upon contact of areas of layers 38 and 42, resulting in a bonded triple wafer of wafers 21, 22 and 23. For step 16, the bonded wafers may be sawed or diced into separate chips or devices 20. Then the devices may be tested.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A detector comprising:
    a first wafer having a cathode;
    a second wafer having a chamber, formed on the first wafer;
    a third wafer, having an anode, formed on the second wafer; and
    a eutectic bond between at least one of the first and second wafers or between the second and third wafers.

2. The detector of claim 1, wherein the chamber is sealed from an environment external to the chamber.

3. The detector of claim 2, wherein the third wafer is transparent to detectable light.

4. The detector of claim 3, wherein the chamber contains a gas.

5. The detector of claim 4, wherein the gas is a mixture of $H_2$ and Ne.

6. The detector of claim 5, wherein the distance between the anode and cathode is between 25 microns and 75 microns.

7. The detector of claim 5, wherein the eutectic bond is between the first and second wafers.

8. The detector of claim 7, further comprising a eutectic bond between the second and third wafers.

9. The detector of claim 8, wherein the first, second and third wafers comprise silica.

10. The detector of claim 9, wherein:
the first wafer has a conductor connected to the cathode for a connection external to the detector; and
the third wafer has a conductor connected to the anode for a connection external to the detector.

11. The detector of claim 10, wherein the anode is a grid.

12. The detector of claim 11, wherein:
the anode comprises a conductive metal; and
the cathode comprises a conductive metal.

13. Means for detecting comprising:
means for emitting electrons;
means for collecting electrons; and
means for containing a gas situated between the means for emitting electrons and the means for collecting electrons; and
wherein the means for emitting electrons, the means for collecting electrons and the means for containing a gas are situated within a wafer structure;
wherein the wafer structure comprises silica wafers bonded with a eutectic material.

14. The means of claim 13, wherein light impinging the gas may cause a current flow between the means for emitting electrons and the means for collecting electrons.

15. The means of claim 13, wherein:
the gas comprises neon; and
the light is UV.

16. A sensor comprising:
a cathode wafer;
a cavity wafer bonded to the cathode wafer; and
an anode wafer bonded to the cavity wafer; and wherein:
the cavity wafer has a cavity having first and second openings sealed by the cathode wafer and the anode wafer, respectively;
the wafers comprise silica; and
the wafers are bonded with a eutectic material.

17. The sensor of claim 16, further comprising:
a cathode situated on the cathode wafer proximate to the first opening of the cavity; and
an anode situated on the anode wafer proximate to the second opening of the cavity.

18. The sensor of claim 17, wherein the cavity has a light-admissible end.

19. The sensor of claim 18, wherein the cavity contains a gas.

20. The sensor of claim 19, further comprising electrical connections to the cathode and the anode.

21. The sensor of claim 19, wherein the gas comprises neon.

22. The sensor of claim 21, wherein:
the gas further comprises hydrogen; and
the portion of neon in the gas is greater than fifty percent.

23. The sensor of claim 17, wherein the cathode wafer, the anode wafer and cavity wafer comprise a plurality of cathodes, anodes and cavities, respectively, that forms a plurality of individual sensors.

24. The sensor of claim 23, wherein the bonded cathode wafer, the anode wafer and cavity wafer are cut into individual chips.

* * * * *